(12) United States Patent
Han et al.

(10) Patent No.: US 9,641,035 B2
(45) Date of Patent: May 2, 2017

(54) STATOR WITH PHASE DRAWING OUT SLOTS FOR SYNCHRONOUS MOTOR

(71) Applicants: Hyundai Motor Company, Seoul (KR); Kia Motors Corporation, Seoul (KR)

(72) Inventors: Dongyeon Han, Seoul (KR); Young Jin Seo, Gyeonggi-do (KR); Hyoungjun Cho, Seoul (KR); Myeong Kyu Jung, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 550 days.

(21) Appl. No.: 14/096,507

(22) Filed: Dec. 4, 2013

(65) Prior Publication Data

US 2014/0184013 A1 Jul. 3, 2014

(30) Foreign Application Priority Data

Dec. 31, 2012 (KR) ........................ 10-2012-0158608

(51) Int. Cl.
*H02K 3/28* (2006.01)
*H02K 21/14* (2006.01)

(52) U.S. Cl.
CPC ............ *H02K 3/28* (2013.01); *H02K 21/14* (2013.01); *H02K 2213/03* (2013.01)

(58) Field of Classification Search
CPC ....... H02K 3/28; H02K 21/14; H02K 2213/03
USPC ......................................... 310/208
See application file for complete search history.

(56) References Cited

U.S. PATENT DOCUMENTS

| 8,008,827 | B1 | 8/2011 | Tang et al. |
| 8,088,227 | B2 | 1/2012 | Burger et al. |
| 2006/0272870 | A1 | 12/2006 | Matsunobu et al. |
| 2012/0025659 | A1* | 2/2012 | Tokumasu ............... H02K 3/12 310/195 |

FOREIGN PATENT DOCUMENTS

| CN | 102306991 A | 1/2012 |
| CN | 102326321 A | 1/2012 |
| CN | 202218072 U | 5/2012 |

(Continued)

OTHER PUBLICATIONS

Machine translation of JP 2012016195 A (Jan. 2012).*

*Primary Examiner* — Michael Andrews
(74) *Attorney, Agent, or Firm* — Mintz Levin Cohn Ferris Glovsky and Popeo, P.C.; Peter F. Corless (57) ABSTRACT

A stator for a motor that includes an armature coil that generates an N-pole and an S-pole by applying a current and forty-eight slots radially formed at which the coil is disposed and in which the armature coil alternately implements N-poles and S-poles by arranging six slots as a single unit as the current is applied to the coil. The slot includes a plurality of phase drawing out slots, and when the order of the phase drawing out slots is determined in a clockwise direction by setting one phase drawing out slot as a first phase drawing out slot, at least two methods of winding the armature coil to turn around the slot may be used to decrease a distance from the first phase drawing out slot to the last phase drawing out slot to a minimum value by setting a cell between neighboring slots as a unit.

3 Claims, 7 Drawing Sheets (56) References Cited

FOREIGN PATENT DOCUMENTS

| | | | | | |
|---|---|---|---|---|---|
| JP | 2001-251703 A | | 9/2001 | | |
| JP | 2008-099416 A | | 4/2008 | | |
| JP | 2012-016195 A | | 1/2012 | | |
| JP | 2012016195 A | * | 1/2012 | .............. | H02K 3/28 |
| KR | 10-2009-0102517 A | | 9/2009 | | |

\* cited by examiner

| C  | Phase drawing out slot | Phase drawing out distance |
|----|------------------------|----------------------------|
| C1 | 1                      | 0                          |
| C2 | 13                     | 12                         |
| C3 | 36                     | 13                         |
| C4 | 48                     | 1                          |

| B  | Phase drawing out slot | Phase drawing out distance |
|----|------------------------|----------------------------|
| B1 | 17                     | 12                         |
| B2 | 40                     | 13                         |
| B3 | 4                      | 1                          |
| B4 | 5                      | 0                          |

| A  | Phase drawing out slot | Phase drawing out distance |
|----|------------------------|----------------------------|
| A1 | 8                      | 1                          |
| A2 | 9                      | 0                          |
| A3 | 21                     | 12                         |
| A4 | 44                     | 13                         |

STATOR WITH PHASE DRAWING OUT SLOTS FOR SYNCHRONOUS MOTOR

CROSS-REFERENCE TO RELATED APPLICATION

This application claims priority to and the benefit of Korean Patent Application No. 10-2012-0158608 filed in the Korean Intellectual Property Office on Dec. 31, 2012, the entire contents of which are incorporated herein by reference.

BACKGROUND (a) Field of the Invention

The present invention relates to a stator for a synchronous motor, and more particularly, to a stator for a synchronous motor, which is used as a power source for an electric vehicle and a hybrid vehicle.

(b) Description of the Related Art

In general, a synchronous motor that is a power source for hybrid and electric vehicles includes a stator, and a rotor. The stator is fixed to a periphery of the rotor. In addition, the rotor is rotated to output power of the synchronous motor to the exterior. Moreover, the stator transmits rotational force to the rotor to rotate the rotor. The rotor is formed in a cylindrical shape, and the stator is formed in a hollow cylindrical shape. In addition, the rotor is inserted into a hollow portion of the stator.

Armature coils are disposed at the stator in a circumferential direction of the stator, and permanent magnets are disposed at the rotor in a circumferential direction of the rotor. In addition, the rotor is rotated as the permanent magnets are pushed in one direction by magnetic fields formed at the armature coils. Moreover, functions of the synchronous motor may be changed based on configurations of the armature coils and the permanent magnets.

When a current is applied to the armature coils, the armature coils become electromagnets. Therefore, torque of the synchronous motor is produced by attractive force and repulsive force between the armature coils and the permanent magnets by north (N) poles and south (S) poles of the armature coils, which became electromagnets, and the permanent magnets.

A winding wire path of the armature coil provided at the stator configures a series circuit or a parallel circuit based on a design of the synchronous motor. In addition, a direction of the current, which flows along the winding wire path of the armature coil, may be reversed to generate an alternating magnetic field by the stator. Meanwhile, a type of winding of the armature coil includes a fractional pitch winding using a coil wherein the pitch between two sides thereof is shorter than one magnetic pole pitch, and a full pitch winding using a coil wherein the pitch between two sides thereof is the same to one magnetic pole pitch. In the winding of the armature coil of the related art, in/out direction of the coil is set to generate the alternating magnetic field by a predetermined rule.

However, the winding of the armature coil in which the in/out direction is set as described above may excessively raise resistance of a phase drawing out unit of the armature coil. In addition, resistance imbalance of the armature coil may be caused.

The above information disclosed in this section is only for enhancement of understanding of the background of the invention and therefore it may contain information that does not form the prior art that is already known in this country to a person of ordinary skill in the art.

SUMMARY

The present invention provides a stator for a synchronous motor having an advantage of minimizing resistance of a phase drawing out unit of an armature coil and resistance imbalance of the armature coil.

An exemplary embodiment of the present invention provides a stator for a synchronous motor, including: an armature coil configured to generate an N-pole and an S-pole by applying a current; and forty-eight slots radially formed at which the armature coil is disposed, wherein an N-pole and an S-pole are alternately disposed at each group of six slots among the forty-eight slots (e.g., four N-poles and four S-poles among the forty-eight slots) as the current is applied to the armature coil, the slot includes four phase drawing out slots, and when the order of the four phase drawing out slots is determined in a clockwise direction by setting one phase drawing out slot among the four phase drawing out slots as a first phase drawing out slot, a distance from the first phase drawing out slot to another phase drawing out slot is limited to thirteen by setting a cell between neighboring slots as a unit.

The forty-eight slots may be disposed in a clockwise direction in the order from No. 1 slot to No. 48 slot, and when the No. 1 slot is the first phase drawing out slot, No. 13 slot, No. 36 slot, and No. 48 slot may be the phase drawing out slots. In addition, when the No. 5 slot is the first phase drawing out slot, No. 17 slot, No. 40 slot, and No. 4 slot may be the phase drawing out slots. When the No. 9 slot is the first phase drawing out slot, No. 21 slot, No. 44 slot, and No. 8 slot may be the phase drawing out slots.

When the current is applied to the armature coil, the N-poles may be generated by arranging six slots among the forty-eight slots as a unit, and the S-poles may be generated by arranging the neighboring six slots as a unit, all of one winding method in which the armature coil may be wound to turn the armature coil sequentially around six slots, in which the N-poles may be generated, in a clockwise direction, and then sequentially turn the armature coil around the other six slots, in which the S-poles may be generated, in a counterclockwise direction, and the other winding method in which the armature coil may be wound to turn the armature sequentially coil around six slots, in which the S-poles may be generated, in a counterclockwise direction, and then sequentially turn around the other six slots, in which the N-poles may be generated, in a clockwise direction, may be used.

The two winding methods may be symmetrically used to set a distance from the first phase drawing out slot to a fourth phase drawing out slot to be 1 by setting the first phase drawing out slot and the fourth phase drawing out slot as a starting point.

Another exemplary embodiment of the present invention provides a stator for a synchronous motor including: an armature coil configured to generate an N-pole and an S-pole by applying a current; and forty-eight slots radially formed at which the armature coil is disposed and of which the number of slots is in multiples of twelve, in which the armature coil may alternately implements N-poles and S-poles by arranging a group of six slots as a single unit as the current is applied to the armature coil, the slot may include a plurality of phase drawing out slots, and when the order of the plurality of phase drawing out slots is determined in a clockwise direction by setting one phase drawing out slot of the plurality of phase drawing out slots as a first phase drawing out slot, at least two methods of winding the armature coil to turn around the slot may be used to set a distance from the first phase drawing out slot to the last phase drawing out slot to a minimum value by arranging a cell between neighboring slots as a unit. The number of the plurality of phase drawing out slots may be the number of the slots divided by twelve.

The at least two winding methods may be winding methods of turning around twelve slots including the N-pole and the S-pole one by one, and may include one method in which the armature coil may be wound to turn the armature coil sequentially around six slots, in which the N-poles may be generated, in a clockwise direction, and then sequentially turn around the other six slots, in which the S-poles may be generated, in a counterclockwise direction, and a second method in which the armature coil may be wound to turn the armature coil sequentially around six slots, in which the S-poles may be generated, in a counterclockwise direction, and then sequentially turn around the other six slots, in which the N-poles may be generated, in a clockwise direction.

The at least two winding methods may be winding methods of turning around twelve slots including the N-pole and the S-pole one by one, the slots may be determined in a sequential order from No. 1 slot to the last numbered slot in a clockwise direction, and when the number of slots is an even multiple of twelve, one method may be used from No. 1 slot to the slot having half the number of slots, and the other method may be used from the next slot of the slot having half the number of slots to the last numbered slot.

The at least two winding methods may be winding methods of turning around twelve slots including the N-pole and the S-pole one by one, the slots may be determined in a sequential order from No. 1 slot to the last numbered slot in a clockwise direction, and when the number of slots is an odd multiple of twelve, one method may be used from No. 1 slot to the slot numbered by (the number of the slots/2)+6, and the other method may be used from the slot numbered by (the number of the slots/2)+7 to the last numbered slot.

| Description of symbols | |
|---|---|
| 1-48: Slot | 100: Stator |
| 110: Armature coil | 112: Phase drawing out unit |
| 114: Neutral point wire connection portion | |

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, fuel cell vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

An exemplary embodiment of the present invention will hereinafter be described in detail with reference to the accompanying drawings.

Figure 1:
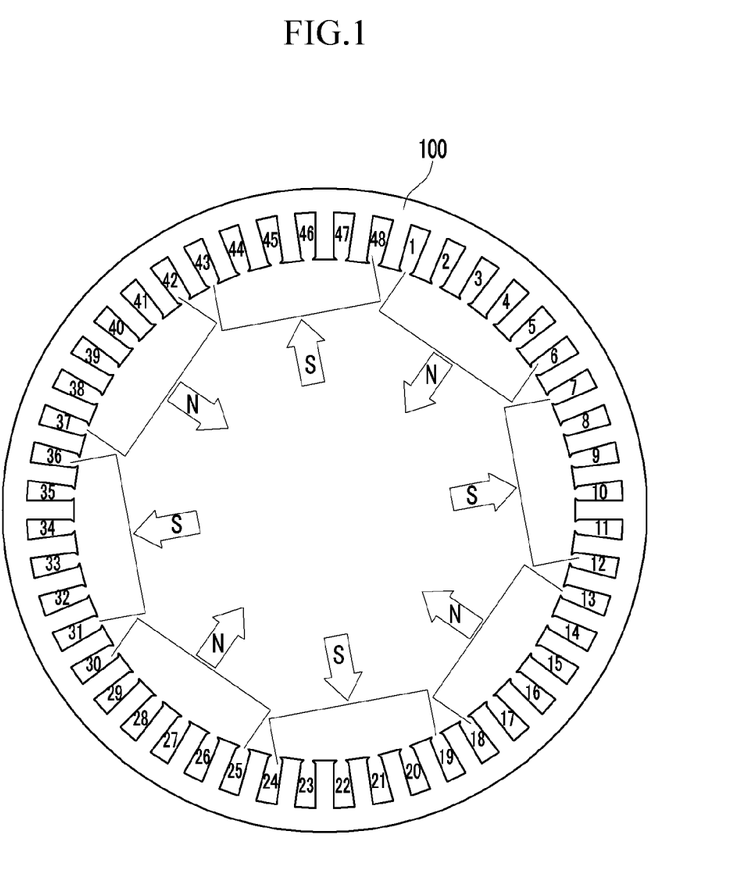
FIG. 1 is an exemplary view illustrating an aspect in which a C-phase alternating magnetic field is generated at a stator for a synchronous motor according to an exemplary embodiment of the present invention.
Figure 2:
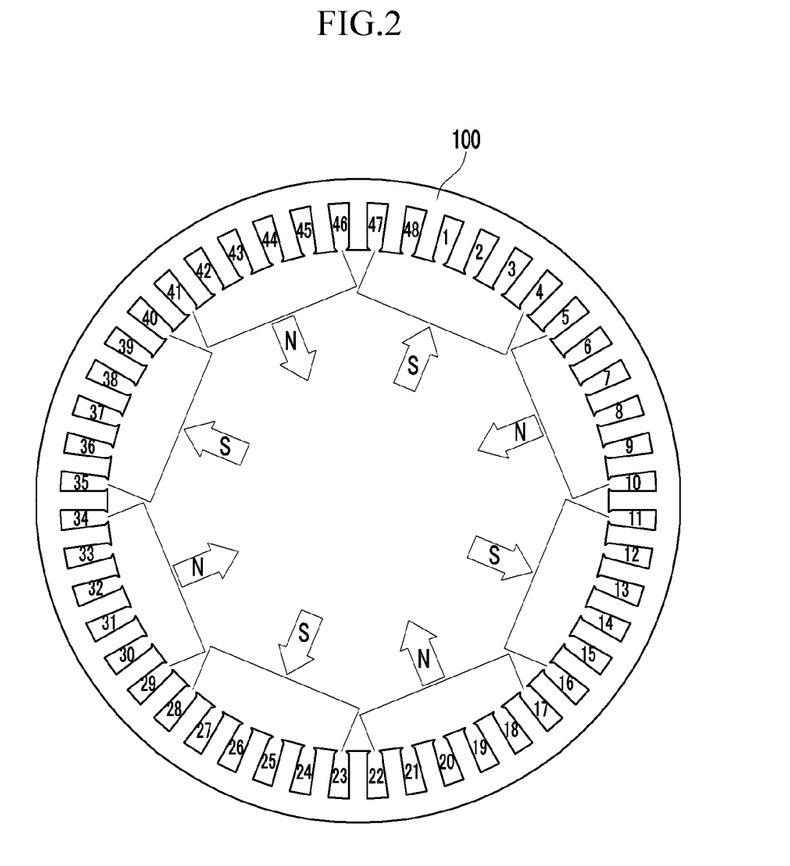
FIG. 2 is an exemplary view illustrating an aspect in which a B-phase alternating magnetic field is generated at a stator for a synchronous motor according to an exemplary embodiment of the present invention.
Figure 3:
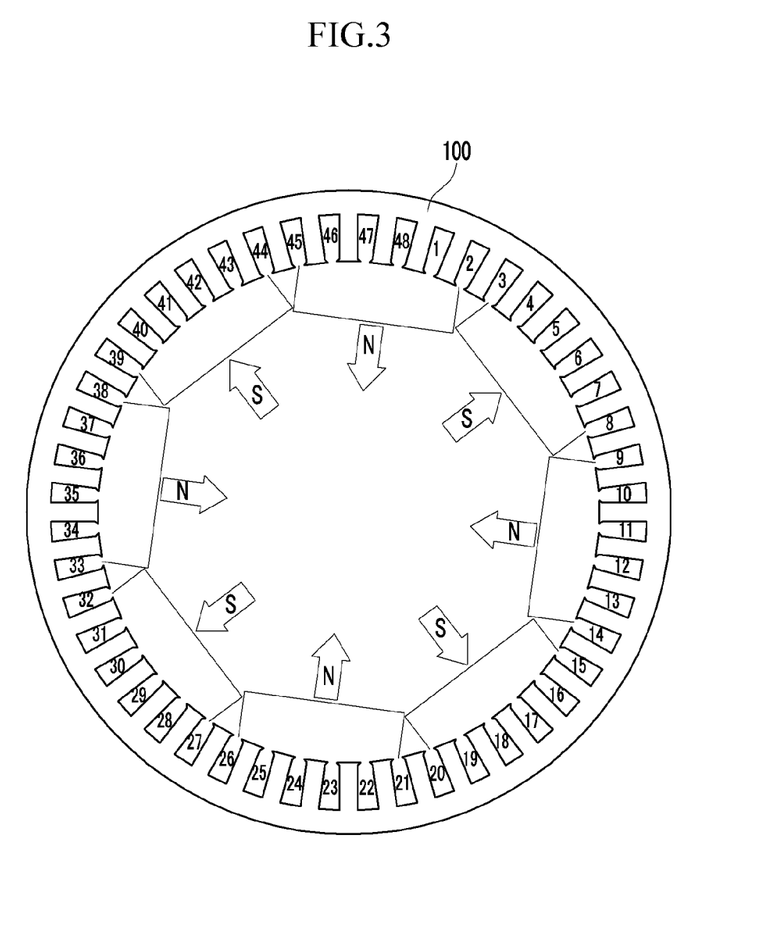
FIG. 3 is an exemplary view illustrating an aspect in which an A-phase alternating magnetic field is generated at a stator for a synchronous motor according to an exemplary embodiment of the present invention.

FIG. 1 is an exemplary view illustrating an aspect in which a C-phase alternating magnetic field is generated at a stator for a synchronous motor according to an exemplary embodiment of the present invention, FIG. 2 is an exemplary view illustrating an aspect in which a B-phase alternating magnetic field is generated at a stator for a synchronous motor according to an exemplary embodiment of the present invention, and FIG. 3 is an exemplary view illustrating an aspect in which an A-phase alternating magnetic field is generated at a stator for a synchronous motor according to an exemplary embodiment of the present invention.

As illustrated in FIGS. 1 to 3, a stator 100 for a synchronous motor may include a plurality of slots of the number of magnetic poles multiplied by the number of phases. The stator 100 for a synchronous motor, which is illustrated in FIGS. 1 to 3, implements eight magnetic poles, an A phase, a B phase, and a C phase. The eight-pole three-phase stator 100 may include the slots in multiples of twenty-four, and FIGS. 1 to 3 illustrate the stator 100 including forty-eight slots 1 to 48. Meanwhile, the number of magnetic poles may be an even number and thus the number of N-poles may be the same as the number of S-poles, and may be variously changed by the person skilled in the art. For example, a ten-pole three-phase stator 100 may include slots in multiples of thirty. However, when six slots form one magnetic pole, the stator 100 may include slots in multiples of twelve.

Hereinafter, an exemplary embodiment of the present invention will be described based on the eight-pole three-phase stator 100 having the forty-eight slots.

Armature coils 110 may be disposed at the forty-eight slots 1 to 48, respectively. Moreover, each of the armature coils 110 which are disposed at the forty-eight slots 1 to 48 may be wound to be connected to each other. The stator 100 for the synchronous motor may be formed in a hollow cylindrical shape, and a rotor (not illustrated) may be disposed in a hollow portion of the stator 100. The configuration of the synchronous motor is apparent to the person skilled in the art, and therefore a more detailed description will be omitted.

The forty-eight slots 1 to 48 may be radially formed from the hollow portion of the stator 100. In addition, each shape of the forty-eight slots 1 to 48 may be the same as each other. The A phase, the B phase, and the C phase mean three phases in which positions of the N-poles and the S-poles of the armature coils 110, which became electromagnets, may be different from each other as currents flow to the armature coil 110 via different paths. In addition, as the A phase, the B phase, and the C phase are alternately implemented, the rotor may be rotated.

In the C phase of FIG. 1, the N-poles may be generated from No. 1 slot 1 to No. 6 slot 6, and the S-poles are generated from No. 7 slot 7 to No. 12 slot 12. In addition, as six slots become a single unit in the same method, the N-poles and the S-poles are alternately generated from No. 13 slot 13 to No. 48 slot 48. Moreover, directions of currents, which flow through the armature coil 110, are opposite to each other in the slot in which the N-pole is generated and the slot in which the S-pole is generated. That is, Winding wire paths of the armature coil 110 are opposite to each other in the slot in which the N-pole is generated and the slot in which the S-pole is generated. For example, when a Winding wire path of the armature coil 110 is formed in a counterclockwise direction by setting slot No. 1 to slot No. 6 as a single unit, a winding wire path of the armature coil 110 may be formed in a clockwise direction by setting slot No. 7 to slot No. 12 as a single unit.

In the B phase of FIG. 2, the N-poles may be generated from slot No. 5 to slot No. 10, and the S-poles may be generated from slot No. 11 to slot No. 16. In addition, as six slots are arranged a single unit in the same method, the N-poles and the S-poles may be alternately generated from slot No. 17 to slot No. 4. Moreover, directions of currents, which flow through the armature coil 110, may be opposite to each other in the slot in which the N-pole is generated and the slot in which the S-pole is generated. In other words, winding wire paths of the armature coil 110 may be opposite to each other in the slot in which the N-pole is generated and the slot in which the S-pole is generated. For example, when a winding wire path of the armature coil 110 is formed in a counterclockwise direction by setting slot No. 5 to slot No. 10 as a single unit, a winding wire path of the armature coil 110 may be formed in a clockwise direction by arranging slot No. 11 to slot No. 16 as a single unit.

In the A phase of FIG. 3, the N-poles may be generated from slot No. 9 to slot No. 14, and the S-poles may be generated from slot No. 15 to slot No. 20. In addition, as six slots are arranged as a single unit in the same method, the N-poles and the S-poles may be alternately generated from slot No. 21 to slot No. 8. Moreover, directions of currents, which flow through the armature coil 110, may be opposite to each other in the slot in which the N-pole is generated and the slot in which the S-pole is generated. In other words, winding wire paths of the armature coil 110 may be opposite to each other in the slot in which the N-pole is generated and the slot in which the S-pole is generated. For example, when a winding wire path of the armature coil 110 is formed in a counterclockwise direction by setting slot No. 9 to slot No. 14 as a single unit, a winding wire path of the armature coil 110 may be formed in a clockwise direction by setting slot No. 15 to slot No. 20 as a single unit.

Figure 4:
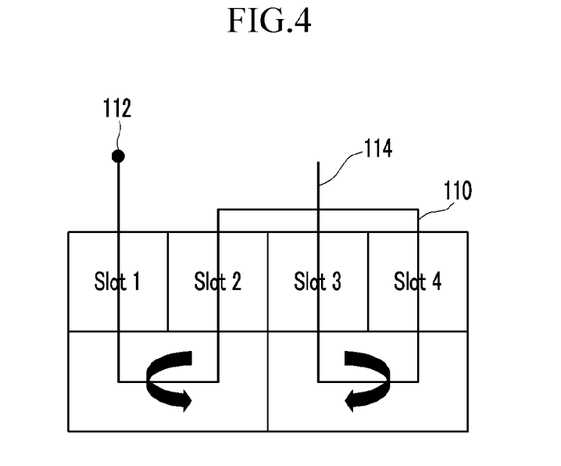
FIG. 4 is an exemplary view illustrating a winding wire path of an armature coil according to an exemplary embodiment of the present invention.

Moreover, in FIGS. 1 to 3, arrows of the N-poles and the S-poles indicate directions of force applied to the rotor by attractive force and repulsive force formed at the N-poles and the S-poles. FIG. 4 is an exemplary view illustrating a winding wire path of an armature coil according to an exemplary embodiment of the present invention, and FIG. 5 is an exemplary view illustrating a winding wire path of an armature coil according to another exemplary embodiment of the present invention.

Figure 5:
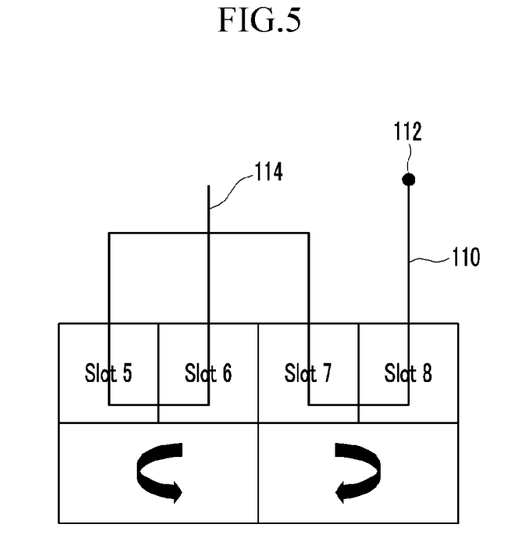
FIG. 5 is an exemplary view illustrating a winding wire path of an armature coil according to another exemplary embodiment of the present invention.

As illustrated in FIGS. 4 and 5, the armature coil 110 may include a phase drawing out unit 112, and a neutral point wire connection portion 114. In addition, the winding wire paths of the armature coil 110 may be opposite to each other in slots in which poles different from each other are generated. The arrow of FIG. 4 indicates a direction in which the armature coil 110 is wound.

The phase drawing out unit 112 is a portion where the A phase, the B phase, or the C phase may be drawn out. In other words, the phase drawing out unit 112 is a slot which may be a starting point of six slots arranged to be a single unit. The neutral point wire connection portion 114 is a portion where the three phases including the A phase, the B phase, and the C phase may be accessed in common. In other words, the neutral point wire connection portion 114 is a portion where the armature coil 110, which is wound to implement the A phase, the B phase, and the C phase, may be connected by wire.

In FIG. 4, Slot 1 and Slot 2 may be the slots which may be a starting point and an end point of six slots arranged to be a single unit. For example, when Slot 1 is slot No. 1, Slot 2 may be slot No. 6, when Slot 1 is slot No. 5, Slot 2 may be slot No. 10, and when Slot 1 is slot No. 9, Slot 2 may be slot No. 14. In addition, Slot 3 and Slot 4 may be the slots which may be a starting point and an end point of six slots arranged to be a single unit, and Slot 3 may be a slot that is a neighboring slot to Slot 2. For example, when Slot 2 is slot No. 6, Slot 3 is slot No. 7, and Slot 4 is slot No. 12.

Moreover, as the armature coil 110 is wound to sequentially pass through Slot 1, Slot 2, Slot 4 and Slot 3, a direction of the armature coil 110 wound at Slot 1 and Slot 2 and a direction of the armature coil 110 wound at Slot 4 and Slot 3 may be opposite to each other. In addition, Slot 1 may be a phase drawing out slot where the phase drawing out unit 112 is disposed, and Slot 3 may be a neutral point slot where the neutral point wire connection portion 114 is disposed.

In FIG. 5, Slot 5 and Slot 6 may be the slots which may be a starting point and an end point of six slots arranged to be a single unit. For example, when Slot 5 is slot No. 37, Slot 6 may be slot No. 42, when Slot 5 is slot No. 41, Slot 6 may be slot No. 46, and when Slot 5 is slot No. 45, Slot 6 may be slot No. 2. In addition, Slot 7 and Slot 8 may be the slots which may be a starting point and an end point of six slots arranged to be a single unit, and Slot 7 may be a slot that is a neighboring slot to Slot 6. For example, when Slot 6 is slot No. 42, Slot 7 is slot No. 43, and Slot 8 is slot No. 48.

Furthermore, as the armature coil 110 is wound to sequentially pass through Slot 8, Slot 7, Slot 5 and Slot 6, a direction of the armature coil 110 wound at Slot 8 and Slot 7 and a direction of the armature coil 110 wound at Slot 5 and Slot 6 may be opposite to each other. In addition, Slot 8 may be a phase drawing out slot where the phase drawing out unit 112 is disposed, and Slot 6 may be a neutral point slot where the neutral point wire connection portion 114 is disposed.

In particular, a method in which the armature coil 110 sequentially passes through Slot 1, Slot 2, Slot 4, and Slot 3 may be a winding method in which the armature coil may be wound to sequentially turn the armature coil around six slots, in which the N-poles may be generated, in a clockwise direction, and then sequentially turn around the other six slots, in which the S-poles may be generated, in a counterclockwise direction. In addition, a method in which the armature coil 110 sequentially passes through Slot 8, Slot 7, Slot 5, and Slot 6 may be a winding method in which the armature coil may be wound to sequentially turn the armature coil around six slots, in which the S-poles may be generated, in a counterclockwise direction, and then sequentially turn around the other six slots, in which the N-poles may be generated, in a clockwise direction.

The two winding methods may be winding methods that turn the armature coil 110 around twelve slots including the N-pole and the S-pole one by one. In addition, the slots may be determined in a sequential order from No. 1 slot to the last numbered slot in a clockwise direction of a circumference of the stator 100.

When the number of slots is an even multiple of twelve, the method, which sequentially passes through Slot 1, Slot 2, Slot 4 and Slot 3, may be used from No. 1 slot to the slot having half the number of slots, and the method, which sequentially passes through Slot 8, Slot 7, Slot 5, and Slot 6, may be used from the next slot of the slot having half the number of slots to the last numbered slot. In addition, when the number of slots is an odd multiple of twelve, the method, which sequentially passes through Slot 1, Slot 2, Slot 4 and Slot 3, may be used from No. 1 slot to the slot numbered by (the number of the slots/2)+6, and the method, which sequentially passes through Slot 8, Slot 7, Slot 5, and Slot 6, may be used from the slot numbered by (the number of the slots/2)+7 to the last numbered slot.

Figure 6:
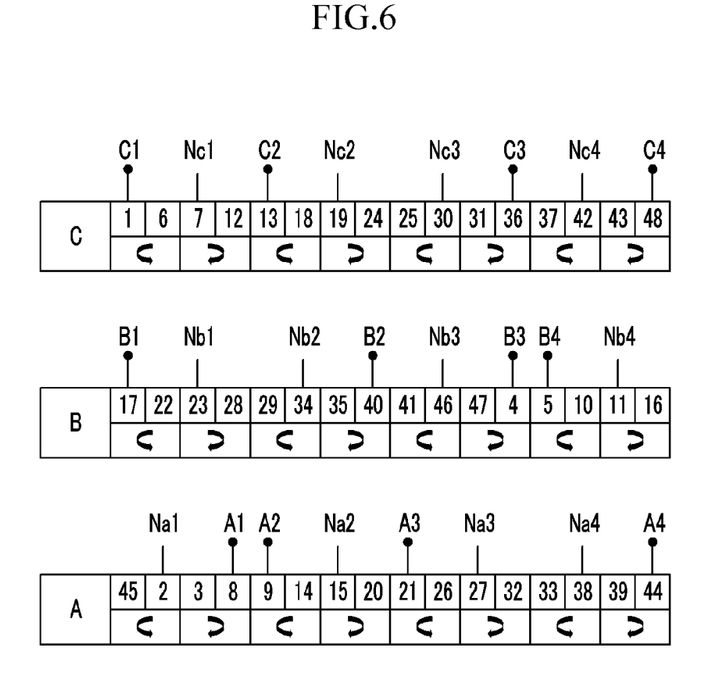
FIG. 6 is an exemplary view illustrating a method of drawing out a stator for a synchronous motor according to an exemplary embodiment of the present invention.

FIG. 6 is an exemplary view illustrating a method of drawing out a stator for a synchronous motor according to an exemplary embodiment of the present invention. In addition, methods of drawing out the stator 100 at the C phase, the B phase, and the A phase are sequentially illustrated from top to bottom in FIG. 6.

The stator 100, which implements the C phase, may include four phase drawing out slots C1, C2, C3 and C4, and four neutral point slots Nc1, Nc2, Nc3, and Nc4. The armature coil 110, which may be disposed at the slot Nos. 1 to 12, and the armature coil 110, which may be disposed at the slot Nos. 13 to 24, may be wound to implement the C phase according to the exemplary embodiment of the present invention which is illustrated in FIG. 4. Therefore, slot No. 1 and slot No. 13 may be the phase drawing out slots C1 and C2, and slot No. 7 and slot No. 19 may be the neutral point slots Nc1 and Nc2. In addition, the armature coil 110, which may be disposed at the slot Nos. 25 to 36, and the armature coil 110, which may be disposed at the slot Nos. 37 to 48, may be wound to implement the C phase according to another exemplary embodiment of the present invention which is illustrated in FIG. 5. Therefore, slot No. 36 and slot No. 48 may be phase drawing out slots C3 and C4, and slot No. 30 and slot No. 42 may be the neutral point slots Nc3 and Nc4.

The stator 100, which implements the B phase, may include four phase drawing out slots B1, B2, B3 and B4, and four neutral point slots Nb1, Nb2, Nb3, and Nb4. The armature coil 110, which may be disposed at the slot Nos. 5 to 16, and the armature coil 110, which may be disposed at the slot Nos. 17 to 28, may be wound to implement the B phase according to the exemplary embodiment of the present invention which is illustrated in FIG. 4. Therefore, slot No. 5 and slot No. 17 may be the phase drawing out slots B4 and B1, and slot No. 11 and slot No. 23 may be the neutral point slots Nb4 and Nb1. In addition, the armature coil 110, which may be disposed at the slot Nos. 29 to 40, and the armature coil 110, which may be disposed at the slot Nos. 41 to 4, may be wound to implement the B phase according to another exemplary embodiment of the present invention which is illustrated in FIG. 5. Therefore, slot No. 40 and slot No. 4 may be the phase drawing out slots B2 and B3, and slot No. 34 and slot No. 46 may be the neutral point slots Nb2 and Nb3.

The stator 100, which implements the A phase, may include four phase drawing out slots A1, A2, A3, and A4, and four neutral point slots Na1, Na2, Na3, and Na4. The armature coil 110, which may be disposed at the slot Nos. 9 to 20, and the armature coil 110, which may be disposed at the slot Nos. 21 to 32, may be wound to implement the A phase according to the exemplary embodiment of the present invention which is illustrated in FIG. 4. Therefore, slot No. 9 and slot No. 21 may be the phase drawing out slots A2 and A3, and slot No. 15 and slot No. 27 may be the neutral point slots Na2 and Na3. In addition, the armature coil 110, which may be disposed at the slot Nos. 33 to 44, and the armature coil 110, which may be disposed at the slot Nos. 45 to 8, may be wound to implement the A phase according to another exemplary embodiment of the present invention which is illustrated in FIG. 5. Therefore, slot No. 44 and slot No. 8 may be the phase drawing out slots A4 and A1, and slot No. 38 and slot No. 2 may be the neutral point slots Na4 and Na1.

Figure 7:
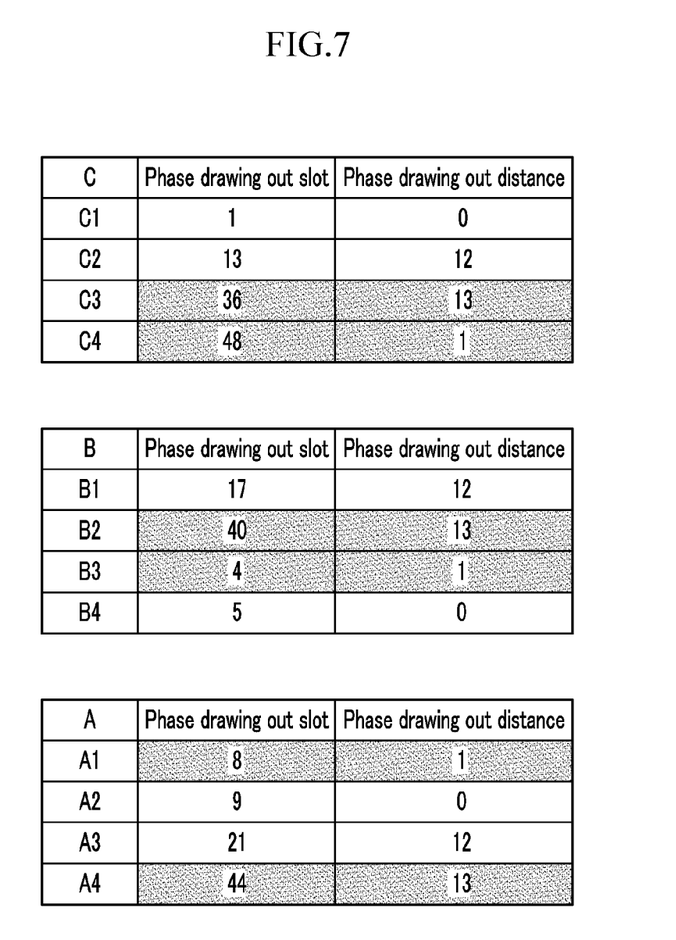
FIG. 7 is an exemplary view illustrating a phase drawing out slot and a phase drawing out distance of a stator for a synchronous motor according to an exemplary embodiment of the present invention.

FIG. 7 is an exemplary view illustrating a phase drawing out slot and a phase drawing out distance of a stator for a synchronous motor according to an exemplary embodiment of the present invention.

As illustrated in FIGS. 6 and 7, the phase drawing out slots C1, C2, C3, and C4 of the C phase may be slot Nos. 1, 13, 36, and 48. In addition, the phase drawing out distance may refer to a distance from a first phase drawing out slot C1 to each of the phase drawing out slots C1, C2, C3, and C4. Moreover, a unit of the phase drawing out distance may be one cell that is based on one slot and another neighboring slot.

Referring to FIG. 1, a distance from slot No. 1, which is the first phase drawing out slot C1, to slot No. 1, which is the first phase drawing out slot C1, may be zero. In addition, a distance from slot No. 1, which is the first phase drawing out slot C1, to slot No. 13, which is a second phase drawing out slot C2, may be twelve in a clockwise direction. Moreover, a distance from slot No. 1, which is the first phase drawing out slot C1, to slot No. 36, which is a third phase drawing out slot C3, may be thirteen in a counterclockwise direction. Moreover, a distance from slot No. 1, which is the first phase drawing out slot C1, to slot No. 48, which is a fourth phase drawing out slot C4, may be one in a counterclockwise direction.

The phase drawing out slots B1, B2, B3, and B4 of the B phase may be slot Nos. 17, 40, 4, and 5. In addition, the phase drawing out distance may refer to a distance from a first phase drawing out slot B4 to each of the phase drawing out slots B4, B1, B2, and B3. Moreover, a unit of the phase drawing out distance may be one cell that is based on one slot and another neighboring slot.

Referring to FIG. 2, a distance from slot No. 5, which is the first phase drawing out slot B4, to slot No. 5, which is the first phase drawing out slot B4, may be zero. In addition, a distance from slot No. 5, which is the first phase drawing out slot B4, to slot No. 17, which is a second phase drawing out slot B1, may be twelve in a clockwise direction. Moreover, a distance from slot No. 5, which is the first phase drawing out slot B4, to slot No. 40, which is a third phase drawing out slot B2, may be thirteen in a counterclockwise direction. Moreover, a distance from slot No. 5, which is the first phase drawing out slot B4, to the slot No 4, which is a fourth phase drawing out slot B3, may be one in a counterclockwise direction.

The phase drawing out slots A1, A2, A3, and A4 of the A phase may be slot Nos. 8, 9, 21, and 44. In addition, the phase drawing out distance may refer to a distance from a first phase drawing out slot A2 to each of the phase drawing out slots A2, A3, A4, and A1. Moreover, a unit of the phase drawing out distance may be one cell that is based on one slot and another neighboring slot.

Referring to FIG. 3, a distance from slot No. 9, which is the first phase drawing out slot A2, to slot No. 9, which is the first phase drawing out slot A2, may be zero. In addition, a distance from slot No. 9, which is the first phase drawing out slot A2, to slot No. 21, which is a second phase drawing out slot A3, may be twelve in a clockwise direction. Moreover, a distance from slot No. 9, which is the first phase drawing out slot A2, to slot No. 44, which is a third phase drawing out slot A4, may be thirteen in a counterclockwise direction. Moreover, a distance from slot No. 9, which is the first phase drawing out slot A2, to slot No. 8, which is a fourth phase drawing out slot A1, may be one in a counterclockwise direction.

In other words, all the phase drawing out distances by the armature coil 110 wound according to the exemplary embodiment and another exemplary embodiment of the present invention may be equal to or less than thirteen.

As described above, according to an exemplary embodiment of the present invention, resistance of the armature coil 110 may be reduced, and resistance imbalance of the armature coil 110 may be improved, by minimizing the drawing out distance which is a distance between the phase drawing out units 112 of the armature coil 110. Therefore, performance of the synchronous motor may be improved. In addition, a length of the armature coil 110 may be shortened. Therefore, material costs of the stator 100 may be reduced.

While this invention has been described in connection with what is presently considered to be exemplary embodiments, it is to be understood that the invention is not limited to the disclosed embodiments. On the contrary, it is intended to cover various modifications and equivalent arrangements included within the spirit and scope of the accompanying claims.

What is claimed is:
1. A stator for a synchronous motor, comprising:
an armature coil configured to generate a north (N) pole and a south (S) pole by applying a current; and
forty-eight slots radially formed at which the armature coil is disposed,
wherein four N-poles and four S-poles are implemented by arranging six slots among the forty-eight slots as a single unit when the current is applied to the armature coil,
wherein each set of four N-poles and each set of four S-poles includes four phase drawing out slots,
wherein one phase drawing out slot among the four phase drawing out slots is set as a first phase drawing out slot when the order of the four phase drawing out slots is determined in a clockwise direction,
wherein a distance from the first phase drawing out slot to another phase drawing out slot is maintained at a distance equal to or less than thirteen units, by setting a circumferential distance between neighboring slots as a unit, and
wherein the forty-eight slots are disposed in a clockwise direction in the order from No. 1 slot to No. 48 slot, and when No. 1 slot is the first phase drawing out slot, No. 13 slot, No. 36 slot, and No. 48 slot are the phase drawing out slots, when No. 5 slot is the first phase drawing out slot, No. 17 slot, No. 40 slot, and No. 4 slot are the phase drawing out slots, and when No. 9 slot is the first phase drawing out slot, No. 21 slot, No. 44 slot, and No. 8 slot are the phase drawing out slots.

2. The stator for a synchronous motor of claim 1, wherein:
when as the current is applied to the armature coil, the N-poles are generated by setting six slots among the forty-eight slots as a unit, and the S-poles are generated by setting the other neighboring six slots as a unit,
a first winding method in which the armature coil is wound to sequentially turn the armature coil around six slots, in which the N-poles are generated, in a clockwise direction, and then sequentially turn around the other six slots, in which the S-poles are generated, in a counterclockwise direction, and
a second winding method in which the armature coil is wound to sequentially turn the armature coil around six slots, in which the S-poles are generated, in a counterclockwise direction, and then sequentially turns around the other six slots, in which the N-poles are generated, in a clockwise direction, are used,
wherein the first and the second winding methods are symmetrically used to cause a distance from the first phase drawing out slot to a fourth phase drawing out slot to be one by setting the first phase drawing out slot and the fourth phase drawing out slot as a start point.

3. A stator for a synchronous motor, comprising:
an armature coil configured to generate a north (N) pole and a south (S) pole by applying a current; and
forty-eight slots radially formed at which the armature coil is disposed,
wherein four N-poles and four S-poles are implemented by arranging six slots among the forty-eight slots as a single unit when the current is applied to the armature coil,
wherein each set of four N-poles and each set of four S-poles includes four phase drawing out slots,
wherein one phase drawing out slot among the four phase drawing out slots is set as a first phase drawing out slot when the order of the four phase drawing out slots is determined in a clockwise direction,
wherein a distance from the first phase drawing out slot to another phase drawing out slot is maintained at a distance equal to or less than a predetermined distance, by setting a circumferential distance between neighboring slots as a unit, and
wherein the forty-eight slots are disposed in a clockwise direction in the order from No. 1 slot to No. 48 slot, and when No. 1 slot is the first phase drawing out slot, No. 13 slot, No. 36 slot, and No. 48 slot are the phase drawing out slots, when No. 5 slot is the first phase drawing out slot, No. 17 slot, No. 40 slot, and No. 4 slot are the phase drawing out slots, and when No. 9 slot is the first phase drawing out slot, No. 21 slot, No. 44 slot, and No. 8 slot are the phase drawing out slots.

* * * * *